June 11, 1935.  R. C. GRASEBY  2,004,526
PREPAYMENT METER MECHANISM
Filed Jan. 4, 1934  2 Sheets-Sheet 1
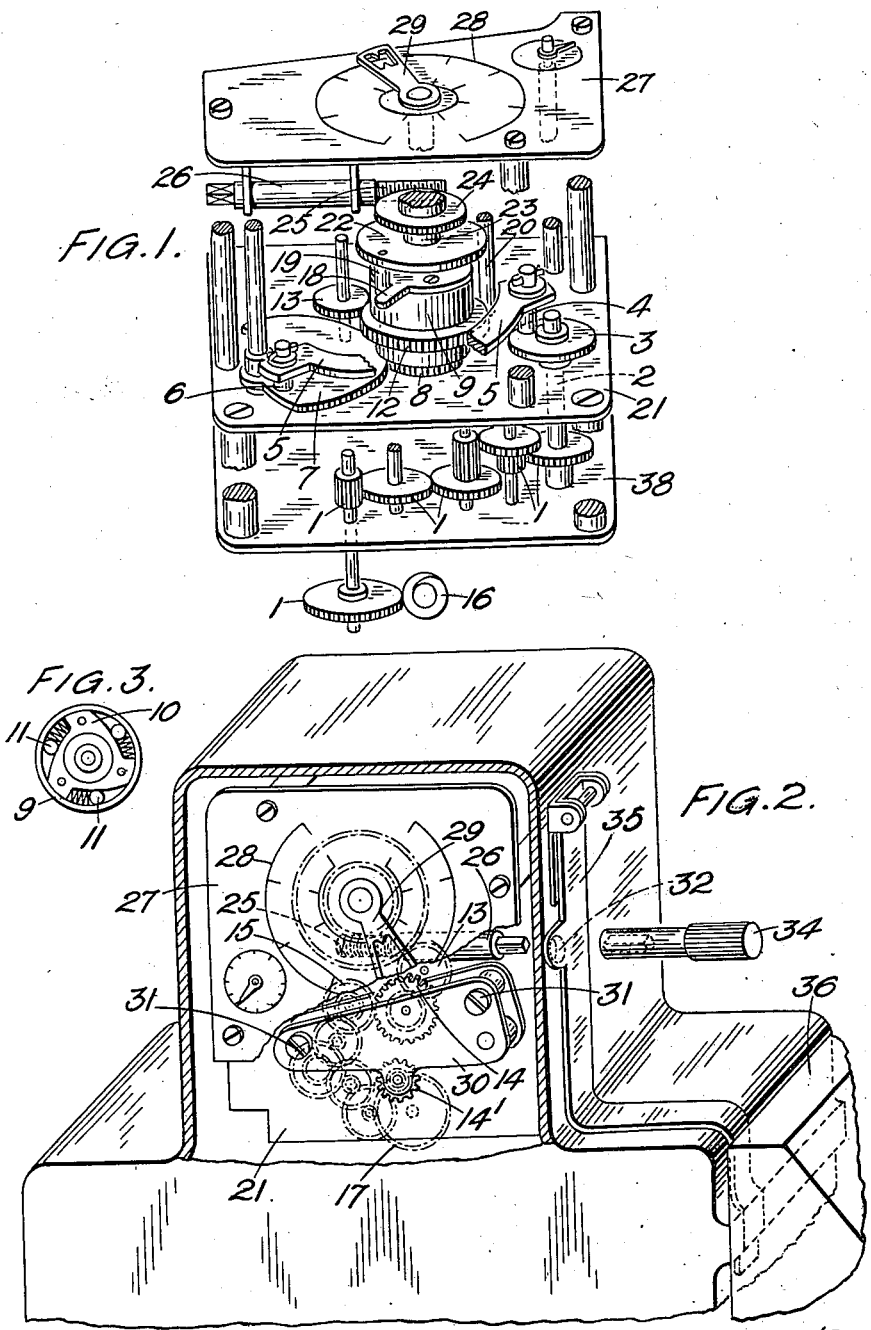

June 11, 1935.    R. C. GRASEBY    2,004,526
PREPAYMENT METER MECHANISM
Filed Jan. 4, 1934    2 Sheets-Sheet 2

Inventor
Robert C. Graseby
Per: Seymour & Thaxer
Attys

Patented June 11, 1935

2,004,526

UNITED STATES PATENT OFFICE 2,004,526

PREPAYMENT METER MECHANISM

Robert Constantine Graseby, New Malden, England

Application January 4, 1934, Serial No. 705,293
In Great Britain January 12, 1933

7 Claims. (Cl. 194—3)

This invention relates to prepayment meter mechanism having means whereby a standing charge, such as may be payable in respect of the installation with which the meter is used, for example, a rent for the meter, may be collected.

Prepayment meter mechanism according to the present invention is of the kind (hereinafter referred to as the kind specified) which comprises (a) controlling means for a supply, (b) prepayment mechanism to operate the controlling means and including a portion that is coin-operated to set another portion of the prepayment mechanism, and connections between the prepayment mechanism and the motor of the meter whereby the said motor controls or drives said other portion of the prepayment mechanism in its return towards a zero position where it causes the controlling means to cut off the supply, and (c) other motor mechanism, for example a spring-driven or electrically-driven motor mechanism (hereinafter referred to for convenience of description as a time motor), which also drives or permits to be driven said other portion of the prepayment mechanism to return it towards its zero position. Such other motor mechanism (time motor) constitutes the means whereby the standing charge is collected.

The invention has for its object to provide means whereby the standing charge may be at any rate selected within limits controlled by the construction of the mechanism, which is accurately adjustable and which will provide for ready ascertainment of the particular standing charge selected.

The prepayment mechanism to which the means referred to may be applied is particularly, though not exclusively, applicable for controlling the supply of electrical energy.

The invention will now be described by way of example, with reference to the accompanying partly diagrammatic drawings wherein:—

Figure 4:
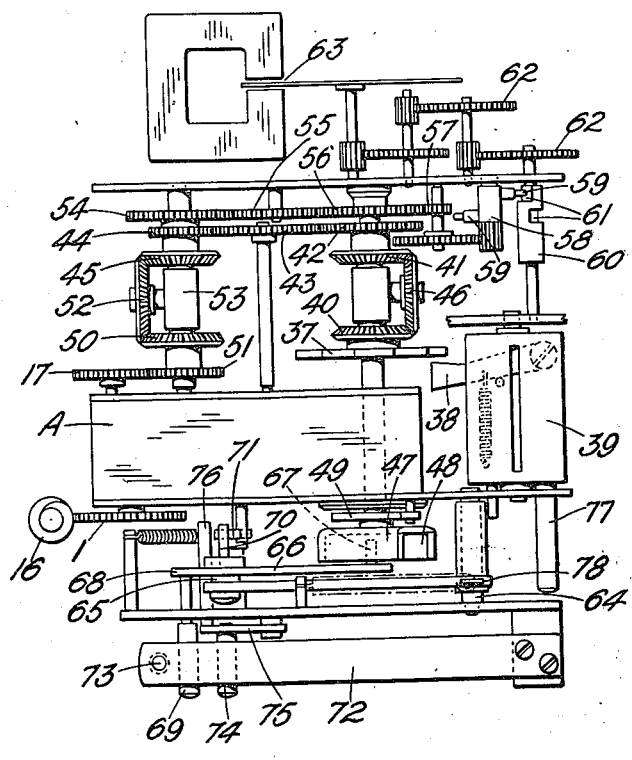
Figure 5:
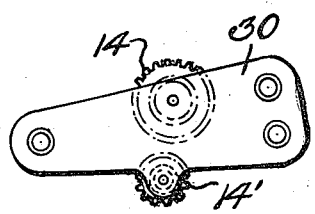

Fig. 1 shows a perspective view of mechanism for use with prepayment meter mechanism to enable a standing charge to be collected at any rate selected within the limits controlled by the construction; parts are broken away, parts of the gearing omitted and the top plate is separated from the remainder of the mechanism for the sake of clearness, Fig. 2 shows a partly perspective view partly in section of the meter casing with the mechanism illustrated in Fig. 1 mounted in the top thereof, Fig. 3 shows a detail of the clutch 3, Fig. 4 shows a partly diagrammatic view of a prepayment meter for electrical energy embodying the mechanism illustrated in Fig. 1, and Figure 5 shows a front elevation of change-gearing forming part of the mechanism of Figure 2.

Reference will first be made to Figs. 1 to 3.

The time motor of the prepayment meter mechanism will usually be a constant speed electric motor indicated at 16. The rotor of this time motor is connected through a train of gears 1, 1, 1, 1, to a spindle 2 carrying a crank comprising a disc 3 having a stud 4 extending from its face. The stud 4 is connected by a connecting rod 5 (shown in the drawings broken away) to a stud 6 carried on a gear member 7 which meshes with a gear member 8. A pair of free-wheel clutches is constituted by a drum member 9 having cylindrical recesses in opposite faces and spider members 10 in said recesses, for example, of the known form shown in Fig. 3 in which in one direction of rotation balls 11 are gripped between the surface of each member 10 and the inner surface of the recess in the member 9. This member 9 carries a gear wheel 12 which is connected through a gear train 13, 14, 15, to the gear wheel 17. The gear member 8 is fixed to the lower spider member 10 (Fig. 1) of the pair of clutches. The other spider member of the pair of clutches has an outwardly projecting arm 18 which extends between a pair of stop pins 19, 20. The pair of clutches is so arranged that the drum member 9 will free-wheel in the same angular direction in relation to spider members 10, the two clutches being viewed from the same direction. One stop pin 20 is carried on a fixed plate 21 of the mechanism and the other stop pin 19 is carried on a disc 22 fixed to a spindle 23 which forms a bearing for the spindle (not shown) of the upper spider member. Said spindle has fixed to it a worm wheel 24 which is engaged by a worm 25 on a spindle 26 which may be turned with a key 34 (see Fig. 2). The spindle 23 projects through a plate 27 bearing a money rate scale 28 and carries a pointer 29 which moves over said scale. By rotating the spindle 26 the position of the stop pin 19 in relation to the stop pin 20 may be adjusted and the amount of the adjustment can be seen by the position of the pointer on the money rate scale.

In order to permit the range to be altered within which the mechanism will collect a fixed charge provision is made for changing the sizes of certain of the gear wheels employed in the mechanism. For this purpose the gear wheel 13 is connected to the first of the gear wheels 15 by gear wheels 14 which, in the example shown, are mounted on a common spindle. Said gear wheels 14 are carried on a removable plate 30 (see Figs. 2 and 5) secured to the mechanism by screws 31. A second set of gear wheels 14' of different size is also carried on the plate 30 and is arranged in such a position that the plate 30 may be turned over to cause said other set of gear wheels 14' to be included in the gear train instead of the gear wheels 14. It will be noted that the plate referred to as 30 consists of two plates which are separated and the gear wheels 14 and 14' are mounted between said two plates.

It will be understood that other plates carrying gear wheels of different sizes may be arranged to be substituted when it is desired to collect a fixed charge within a still different range.

The end of the worm spindle 26 is opposite to a hole 32 in the casing 33 in which the meter mechanism is mounted so as to permit the application of the key 34. The hole 32 is covered by a hinged door 35 which is locked by the coin box 36 when the latter is placed in position.

The operation of the mechanism is as follows: The time motor drives the crank disc 3 continuously in one direction and by means of the crank 4 and connecting rod 5 continuous rocking motion is imparted to the lower spider member of the pair of clutches. The members 9, 10 of both clutches are in such close engagement that there is sufficient grip to cause them to move together unless one part is held. When the lower spider member of the clutches is rocked in one direction, for the first part of its movement it carries with it (in free-wheel position but held by friction) the drum member 9 of the clutches and also the upper spider member until the arm 18 thereon engages one of the pair of stop pins 19, 20. When this happens said upper spider member is held and clutches and holds the drum member 9 and the lower spider member continues its motion by free-wheeling in relation to the said member 9. When the motion of the lower spider member is reversed so that it is rocked in the other direction it grips the member 9 and thus moves the latter and with it the upper spider member of the clutches reversely. This reverse movement continues until the arm 18 of said upper spider member engages the other stop pin when it is held and the lower spider member (together with the member 9 locked to it) continues to move until the motion of the driving crank 4 causes the lower spider member to move again in the first direction. The effect of this movement is that the drum member 9 of the clutches moves a certain distance in one direction, which is controlled by the distance apart of the two stop pins 19, 20 and moves in the reverse direction a distance which is the whole distance of movement in said direction of the lower spider member. The difference between these two amounts of movement is transferred through the gearing 12, 13 to drive a part of the prepayment mechanism (or act to permit a spring to drive said part of the prepayment mechanism) in the same direction as the motor mechanism of the meter drives, or permits to be driven said part of the prepayment mechanism to return it to a zero position to cause the controlling means to cut off the supply.

By adjusting the distance apart of the stop pins 19, 20 by rotating the disc 22 the amount of motion transmitted by the gearing may be varied and the distance apart of the stop pins will be set in accordance with the amount of standing charge which is to be collected. In use the pointer 29 is set on the scale 28 so that the mechanism will provide for the collection of a desired standing charge and the range may be for one position of the plate 30 say between sixpence and four shillings per week. This range may be varied, for example, to one shilling to eight shillings per week by altering the plate 30. The various gear wheels and parts are mounted between the plates 21, 27 and 38 in the usual manner.

The mechanism described above may be employed in any meter in which a time motor is employed to drive or permit to be driven the other portion of the prepayment mechanism of a meter to return said mechanism towards its zero position. The mechanism described above is inserted between such time motor and said other portion of the prepayment mechanism.

The stop pins 19, 20 may be carried on the upper spider member of the pair of clutches and the arm 18 be mounted on a fixed part of the mechanism. The position of both stop pins may be adjustable.

Reference will now be made to Fig. 4 which shows a partly diagrammatic view of a prepayment meter for electrical energy embodying the mechanism illustrated in Fig. 1. The prepayment mechanism includes a star wheel 37 which is rotated by the engagement of an arm or projection 38 on the coin drum 39 when a coin is inserted in said drum and the latter is rotated. The star wheel 37 is fixed to one sun wheel 40 of a first differential, the other sun wheel 41 being connected through gearing 42, 43, 44, to one sun wheel 45 of a second differential. The planet wheel 46 of the first differential is connected to the other portion of the prepayment mechanism. Said other portion of the mechanism comprises a disc having an upstanding rim 47 with a gap 48 therein. The disc is fixed to the spindle which carries the planet wheel 46, said planet wheel being mounted to rotate axially in the usual manner on a part extending from said spindle. Said other portion of the prepayment mechanism has driving means comprising a spring 49 which is wound when the coin operated portion of the mechanism is operated, that is, when the star wheel 37 is rotated, and which tends to drive the other portion of the prepayment mechanism reversely towards a zero position where it causes the controlling means to cut off the supply. The second sun wheel 50 of the second differential is connected through a gear wheel 51 to the gear wheel 17 of the mechanism illustrated in Fig. 1. Said mechanism is enclosed in the box marked A. 16 is a constant speed electric motor which is connected to the first gear wheel 1 of said mechanism. The planet wheel 52 of the second differential is mounted on a spindle 53 to rotate bodily with it and is also mounted to rotate axially in the usual manner on a part extending from said spindle. A gear wheel 54 is fixed on said spindle and is connected through a gear wheel 55 to a gear wheel 56 which is free on the spindle carrying the sun wheel 41 of the first differential. The gear wheel 56 is connected through gearing 57 to a flier comprising a spindle 58 having a pair of diametrically arranged pins or arms 59. A barrel 60 having two flats or grooves 61 extending from opposite sides to the centre line and arranged to coincide with the pins or arms 59 is spaced from the spindle 58 at a distance such that the pins or arms engage the barrel 60 and the driving means is held up hereby until said barrel 60 rotates to such a position that a pin or arm can pass over a flat or through a groove and thus release the driving means. The barrel 60 is driven through gearing indicated at 62 by the meter motor indicated at 63.

The switch mechanism which comprises the controlling means for the supply will now be briefly referred to.

This mechanism is more fully disclosed in the specification of my Patent No. 1,962,391.

A first lever pivoted at 64 carries pivotally at 65 at the end of one arm a floating lever whose one arm 66 carries a retaining pin 67 normally disposed within the rim 47 and which will move through the gap 48 therein. The other arm 68 of the floating lever carries an upstanding pin 69 which engages a first spring switch arm carrying a first contact. The floating lever also has an extension which carries an additional pin 70 which engages with the spring controlled retaining catch 71. A second spring switch arm 72 carries a contact 73. The first spring switch arm is behind the arm 72 shown in the drawing and is so disposed that the two contacts cooperate and are the contacts of the switch or controlling means for the supply of electrical energy. The switch arm 72 is engaged by a pin 74 on one arm of a further lever 75 whose other arm carries a pin 76 which lies in the path of the retaining catch 71.

The operation of the mechanism illustrated in Fig. 4 is as follows:—A coin having been inserted in the drum 39, the latter is rotated whereby the arm 38 causes the star wheel 37 to be rotated and the spring 49 to be wound up. The rim 47 is at the same time moved to a position such that the retaining pin 67 is held within it and the first lever is moved to close the switch contacts. This is effected as follows:—The drum 39 carries a pin 77 which when the drum is rotated engages the arm 78 of the first lever. The retaining pin 67 on the floating lever bears on the inside of the rim 47 and thus the floating lever moves with the first lever about the pin 67 against a spring. The upstanding pin 69 moves the first spring switch arm, which is disposed behind the arm 72, towards said second spring switch arm 72. During this movement the additional pin 70 on the floating lever moves the retaining catch 71 against its spring and thus causes the lever 75 to move and the pin 74 on it to move the second switch arm 72 in the same direction as the first switch arm. This continues until the pin 70 on the floating lever moves past the end of the catch 71 when the latter is released and returns to the original position under the action of its spring. The lever 75 is then free and the second switch arm 72 moves quickly towards the first switch arm to close the switch and the retaining catch holds it closed.

Assume the time motor 16 to be stationary and the meter motor 63 operating. Said motor drives the barrel 60 through the gearing 62 thereby releasing the arms 59 and allowing the spindle 58 to rotate. Consequently the gear wheel 56 rotates and through the gear wheels 55 and 54 the planet wheel 52 moves round bodily and thus the sun wheel 45 rotates. The sun wheel 41 rotates with the sun wheel 45 and the planet wheel 46 thus also rotates bodily, the drive being effected by the spring 49. The rim 47 is thus returned towards a zero position at which the controlling means cuts off the supply when the quantity has been supplied for which payment has been made. Assume now the time motor 16 to be operating and the meter motor 63 to be stationary. In these circumstances the gear wheel 17 is permitted to rotate. Thus the sun wheel 50 of the second differential rotates and causes an axial rotation of the planet wheel 52 so that the sun wheel 45 rotates and from it the sun wheel 41 of the first differential, whereby the planet wheel 46 rotates bodily and with it the rim 47, the arrangement being such that the constant speed motor 16 permits the spring 49 to drive the rim 47. This drive operates even when the motor mechanism of the meter is not operating and until the rim 47 has travelled the distance it would have travelled if the consumption had continued until the energy prepaid had been used. On the insertion of another coin in the meter the mechanism may be reset and a further supply obtained. As has been described with reference to Fig. 1 the amount of rotation of the gear wheel 17 will depend upon how the mechanism indicated at A has been set.

In practice the time motor 16 and the meter motor 63 are usually operating simultaneously to permit the spring 49 to drive the other portion 47 of the prepayment mechanism towards the zero position.

It will be understood that the meter motor 63 and the time motor 16 may be interchanged.

When the rim 47 is returned to its zero position the pin 67 can move out through the gap 48. The switch then opens under the action of the springiness of the switch arms or of another spring embodied in the mechanism.

What I claim is:—

1. For a prepayment meter mechanism having means for collecting a "fixed" charge including a time motor, and a supply-control means, means for connecting the time motor with the supply-control means comprising a pair of free-wheel clutches whose members are similarly disposed (when viewed from one and the same direction) and are in such frictional engagement that they move together, even in the free-wheeling direction, unless one member is held, mechanism for operatively connecting the time motor with one member of one of the clutches and adapted for imparting thereto a rocking movement with a constant stroke, stop means for restricting the stroke of rocking movement of the corresponding member of the other clutch, means for adjusting said stop means, and means for connecting the other members of the clutches together and to the supply-control means, the latter thereby receiving the restricted stroke in the one direction and the full constant stroke in the other direction.

2. For a prepayment meter mechanism having means for collecting a "fixed" charge including a time motor, and a supply-control means, means for connecting the time motor with the supply-control means comprising a pair of free-wheel clutches whose members are similarly disposed (when viewed from one and the same direction) and are in such frictional engagement that they move together, even in the free-wheeling direction, unless one member is held, mechanism for operatively connecting the time motor with one member of one of the clutches and adapted for imparting thereto a rocking movement with a constant stroke, stop means for restricting the stroke of the corresponding member of the other clutch and consisting of a pair of pins and an arm extending between them, the said pins and the said arm being carried one by the said corresponding member of the other clutch and the other from a fixed part of the meter mechanism, means to vary the distance apart of the pins, and means for connecting the other members of the clutches together and to the supply-control means, the latter thereby receiving the restricted stroke in the one direction and the full constant stroke in the other direction.

3. Apparatus according to claim 2, wherein one pin is permanently fixed in position and the other adjustable towards and away from it.

4. For a prepayment meter having a time motor and a supply-control means, means for operatively connecting the said motor and supply-control means comprising two free-wheel clutches whereof the members are similarly disposed (viewed from the same direction) and are in such frictional engagement that they move together also in the free-wheeling direction unless one member is held, rocking mechanism operatively connected with one member of one of the clutches and adapted for being connected with the time motor, an arm connected to the corresponding member of the other clutch, a fixed stop-pin on one side of said arm, a support mounted co-axially with the clutches, a stop-pin on the other side of said arm and carried by said support, gearing for adjusting the said support, and means for connecting the other members of the clutches together and to the control means.

5. Apparatus according to claim 4, comprising also an indicator operatively connected with the gearing for adjusting the support and stop-pin carried thereby.

6. For a prepayment meter having a time motor and a supply-control means, means for connecting the motor and supply-control means comprising clutch means, rocking mechanism connected to said clutch means and adapted for being driven by the time motor, an operative gear-connection between said clutch means and the supply-control means including interchangeable sets of different gear-wheels, and a carrier for the said sets of gear-wheels which may be changed in position to bring one or the other set of gear-wheels into engagement.

7. Apparatus according to claim 6 wherein the inter-changeable sets of different gear-wheels are journalled in a detachable plate and means is provided for mounting the plate in either of two relatively inverted positions to bring one or the other set of gear-wheels into engagement.

ROBERT CONSTANTINE GRASEBY.